United States Patent
Wu

(10) Patent No.: US 8,371,762 B2
(45) Date of Patent: Feb. 12, 2013

(54) OPTICAL FIBER CONNECTOR WITH RESISTING BLOCKS

(75) Inventor: Kun-Chan Wu, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 287 days.

(21) Appl. No.: 12/943,004

(22) Filed: Nov. 10, 2010

(65) Prior Publication Data

US 2012/0008902 A1    Jan. 12, 2012

(30) Foreign Application Priority Data

Jul. 7, 2010  (TW) .............................. 99122257 A

(51) Int. Cl.
*G02B 6/34* (2006.01)
*G02B 6/00* (2006.01)

(52) U.S. Cl. ......................................... 385/77; 385/147
(58) Field of Classification Search ..................... 385/53, 385/55, 75, 76, 77, 88, 147
See application file for complete search history.

(56) References Cited

U.S. PATENT DOCUMENTS

| | | | | |
|---|---|---|---|---|
| 5,418,875 A * | 5/1995 | Nakano et al. | | 385/77 |
| 6,459,835 B1 * | 10/2002 | Nagaoka et al. | | 385/43 |
| 6,814,499 B2 * | 11/2004 | Finona | | 385/76 |
| 7,690,848 B2 * | 4/2010 | Faika et al. | | 385/59 |
| 7,997,805 B1 * | 8/2011 | Lin | | 385/75 |
| 2002/0197023 A1 * | 12/2002 | Serizawa | | 385/88 |

* cited by examiner

*Primary Examiner* — Akm Enayet Ullah
(74) *Attorney, Agent, or Firm* — Altis Law Group, Inc.

(57) ABSTRACT

An optical fiber connector includes a connector hold, a connector body and a number of optical fibers. The hold defines a receiving recess. The connector body is held in the receiving recess of the connector hold. The optical fibers pass through the connector hold and are attached to the connector body. The connector body includes two engagement blocks formed on opposite side surfaces thereof. The connector hold defines two grooves corresponding to the engagement blocks. The engagement blocks are engaged in the corresponding grooves. The connector body is restricted by the groove in the receiving recess from tilting relative to the connector hold.

11 Claims, 3 Drawing Sheets

OPTICAL FIBER CONNECTOR WITH RESISTING BLOCKS

BACKGROUND

1. Technical Field

The present disclosure relates to connectors, and particularly, to an optical fiber connector.

2. Description of Related Art

An optical fiber connector couples optical fibers. The optical fiber connector typically includes a hold portion and a connector body held in the hold portion. One end of the connector body is connected to a number of optical fibers; the other end of the connector body has a number of lenses positioned thereon, and each lens is aligned with a corresponding optical fiber. When in use, two optical fiber connectors are connected to each other to couple the optical signals between two optical fibers using the lenses. The connector bodies of the connectors are in contact with each other, and the optical signals can be transmitted from one optical fiber to another. The optical fiber connector further includes a resilient member (typically, a helical spring) employed to enhance contact and stabilize the connector body.

One end of the helical spring adjoins the inner surface of the holding portion while the other end adjoins an end of the connector body connecting to the optical fiber. However, when two optical fiber connectors are connected, if the force acting on the optical fiber connectors is asymmetrical, the connector body may be tilted relative to the corresponding holding portion.

What is needed therefore is an optical fiber connector addressing the above-mentioned problems.

BRIEF DESCRIPTION OF THE DRAWINGS

The components of the drawings are not necessarily drawn to scale, the emphasis instead being placed upon clearly illustrating the principles of the embodiments of the optical fiber connector. Moreover, in the drawings, like reference numerals designate corresponding parts throughout several views.

DETAILED DESCRIPTION

Figure 1:
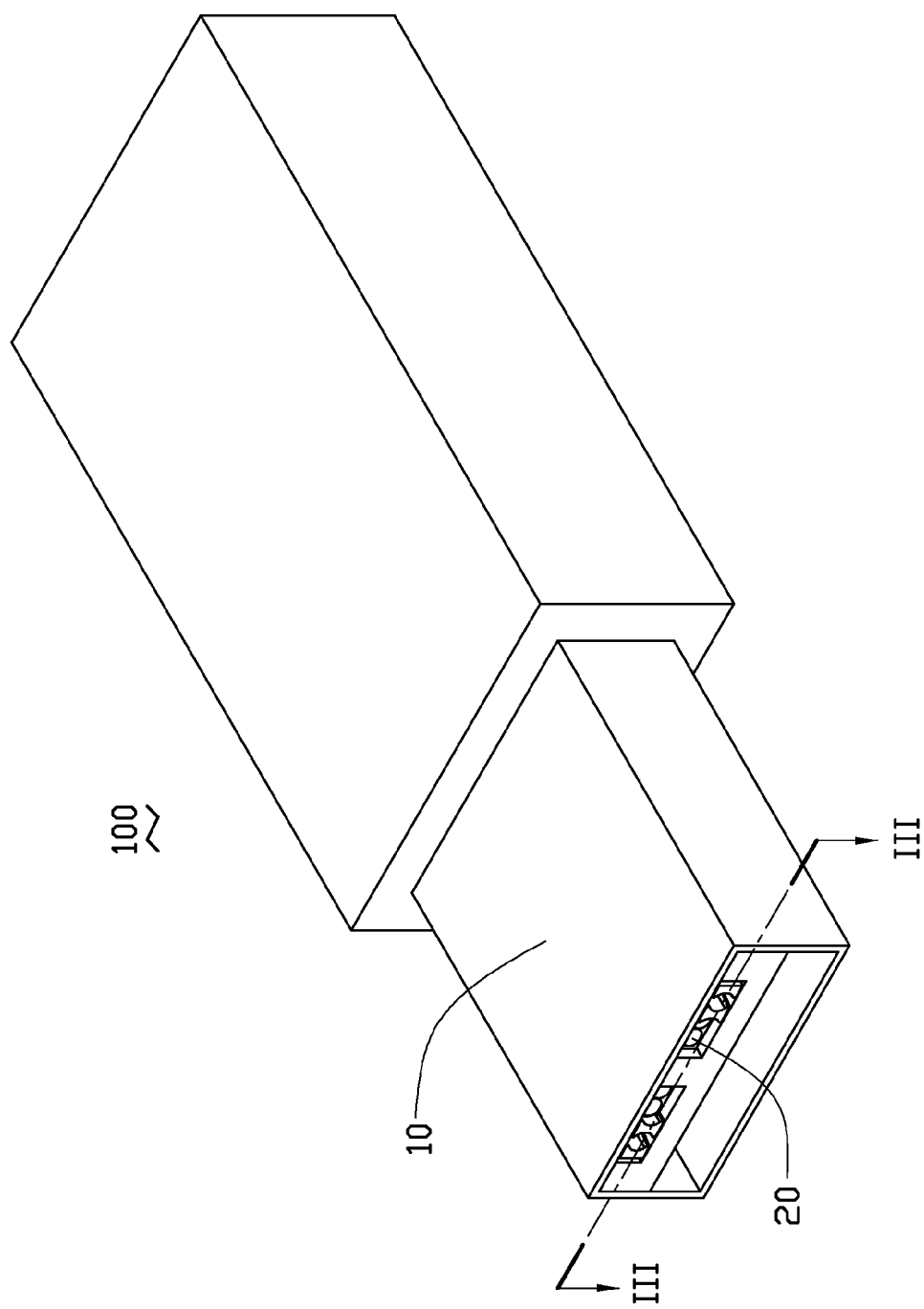
FIG. 1 is an isometric view of an optical fiber connector, according to an exemplary embodiment of the present disclosure.
Figure 2:
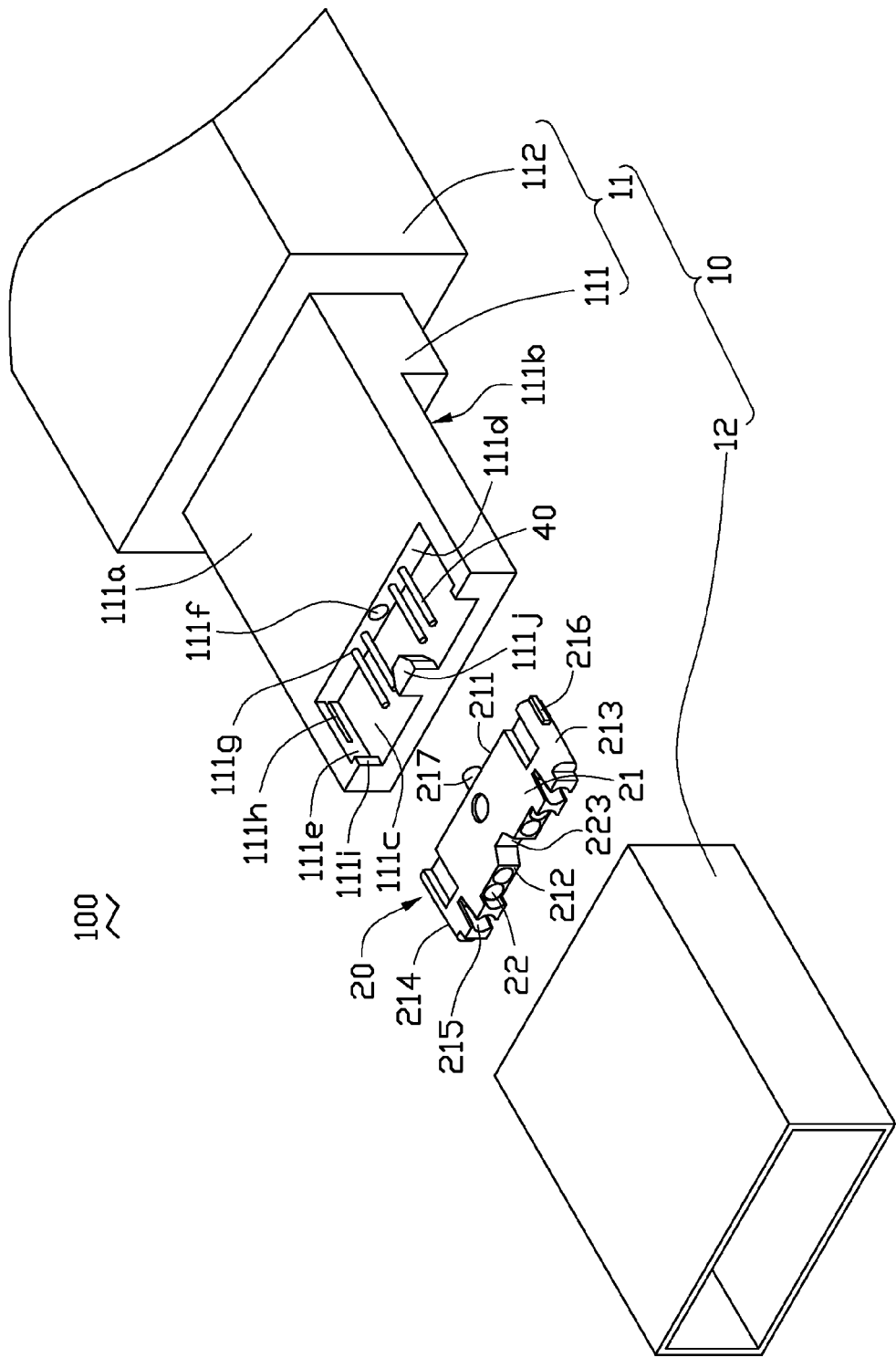
FIG. 2 is a partially exploded view of the optical fiber connector of FIG. 1.
Figure 3:
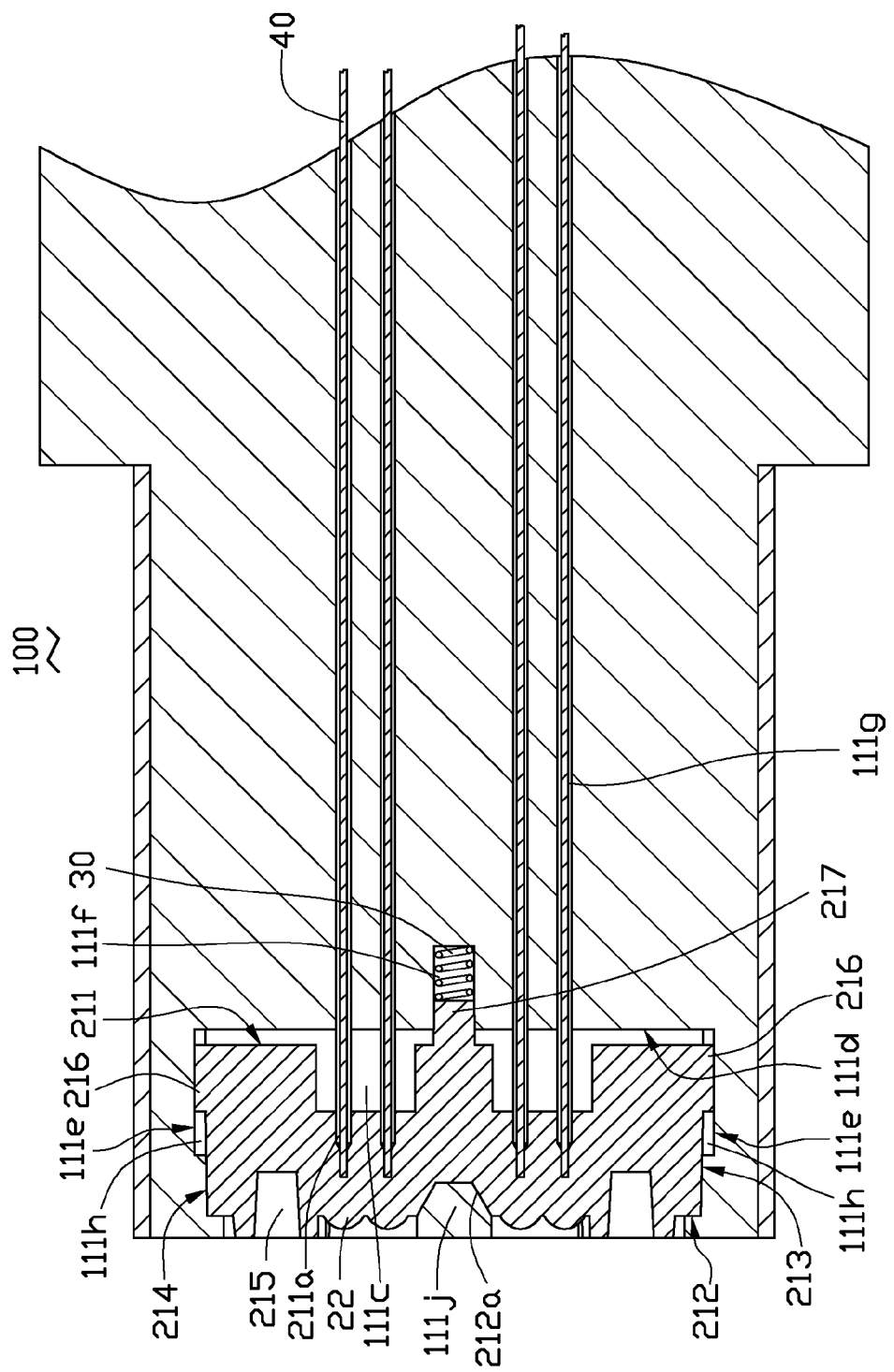
FIG. 3 is a sectional view of the optical fiber connector of FIG. 1, taken along line III-III.

Referring to FIGS. 1-3, an optical fiber connector 100, according to an exemplary embodiment, is shown. The optical fiber connector 100 includes a connector hold 10 and a connector body 20.

The connector hold 10 includes a positioning member 11 and a sleeve member 12. The positioning member 11 includes an insert 111 and a handle 112 integrally formed with the insert 111. The insert 111 includes an upper surface 111a and an opposite lower surface 111b. The insert 111 defines a receiving recess 111c in the upper surface 111a thereof. The receiving recess 111c extends exposed at a distal end surface of the insert 111. The receiving recess 111c includes a first side surface 111d and two opposite second side surfaces 111e. The first side surface 111d defines a position hole 111f and a number of through holes 111g each is used for an optical fiber to pass therethrough. In this embodiment, the number of the through holes 111g is four. Each of the second side surfaces 111e defines a slender groove 111h therein. The insert 111 further includes two first resisting blocks 111i and a second resisting block 111j located. The two first resisting blocks 111i extend from the second side surface toward each other; the second resisting block 111j is formed between the two first resisting blocks 111i.

The sleeve member 12 is substantially rectangular and hollow. The sleeve member 12 receives the insert 111 of the positioning member 11 therein.

The connector body 20 includes a main portion 21 and a number of lenses 22 for optically coupling to the respective optical fibers 40. The main portion 21 includes a first surface 211, a second surface 212, a third surface 213 and a fourth surface 214. The first surface 211 and the second surface 212 are on opposite sides of the main portion 21 and are substantially parallel to each other. The third surface 213 and the fourth surface 214 are on opposite sides of the main portion 21 and are substantially parallel to each other. The first surface 211 and the second surface 212 are substantially perpendicular to the third surface 213 and the fourth surface 214. The first surface 211 defines a number of fixing holes 211a corresponding to the through holes 111 therein, and each fixing hole 211a is aligned with a corresponding through holes 111. Each of the fixing holes 211a receives and fixes an end of an optical fiber 40 therein. The second surface 212 defines two engagement portions 215. The engagement portions 215 engage with a matched optical fiber connector (not shown). The main portion 21 includes two engagement blocks 216 corresponding to the grooves 111h. The engagement blocks 216 are respectively formed on the third surface 213 and the fourth surface 214. The main portion 21 includes a positioning pole 217 formed on the first surface 211 thereof. The second surface 212 includes a cutout portion 212a corresponding to the second resisting block 111j. The lenses 22 are positioned in the second surface 212 of the main body 21 and each align with a corresponding fixing hole 211a. In this embodiment, the lenses 22 are integrally formed with the main portion 21.

The optical fiber connector 100 further includes an elastic member 30 elastically supporting the connector body 20 in the receiving recess 111c of the connector hold 10. In this embodiment, the elastic member 30 is a helix spring.

In assembly, the connector body 21 is received in the receiving recess 111c. The elastic member 30 is received in the positioning hole 111f. The positioning pole 217 is inserted into the positioning hole 111f. A distal end of the positioning pole 217 is elastically contacted with an end of the elastic member 30. The engagement blocks 216 are engaged into the corresponding grooves 111h. The second surface 212 nearby both of the third surface 213 and the fourth surface 214 resists on the first resisting blocks 111i. The cutout portion 223 of the second surface 212 resists on the second resisting block 111j. The optical fibers 40 pass through the corresponding through holes 111g and are inserted and fixed in the corresponding fixing holes 211a. Each optic fiber 40 is aligned with a corresponding lens 22.

Because the engaging blocks 216 are engaged in the corresponding groove 111h, the tilting of the connector body 20 relative to the connector hold 10 caused by an outside force can be avoided, thus the coupling precision of the optical fiber connector 100 is ensured. In addition, the elastic member 30 can provide an elastic force on the connector body 20, thus can protect the connector body 20 from damage when a sudden force acts on the optical fiber connector 100.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An optical fiber connector, comprising:
a connector hold defining a receiving recess;
a connector body held in the receiving recess of the connector hold; and
a plurality of optical fibers passing through the connector hold and attached to the connector body;
wherein the connector hold comprises a positioning member and a sleeve member, the positioning member comprises an insert and a handle integrally formed with the insert, the insert is inserted into the sleeve member, the connector body is mounted on the insert, the insert comprises two first resisting blocks and a second resisting block located between the first resisting blocks, the two first resisting blocks extend from two opposite surfaces of the receiving recess toward each other, the connector body is resisted on the first resisting blocks and the second resisting block, the connector body comprises two engagement blocks formed on opposite side surfaces thereof, the connector hold defines two grooves corresponding to the engagement blocks, the engagement blocks are engaged in the corresponding grooves, the connector body is restricted by the groove in the receiving recess from tilting relative to the connector hold.

2. The optical fiber connector of claim 1, wherein the insert comprises an upper surface and a lower surface, the receiving recess is defined in the upper surface, the receiving recess exposed at a distal end surface of the insert.

3. The optical fiber connector of claim 2, wherein the receiving recess comprises a first side surface and two opposite second side surfaces, the first side surface defines a plurality of through holes, each optical fiber passes through a corresponding through hole, and the grooves are defined in the corresponding second side surfaces.

4. The optical fiber connector of claim 1, wherein the connector body comprises a main portion and a number of lenses located on the main portion.

5. The optical fiber connector of claim 4, wherein the main portion comprises a first surface, a second surface, a third surface and a fourth surface, the first surface and the second surface are on opposite sides of the main portion and are substantially parallel to each other, the third surface and the fourth surface are on opposite sides of the main portion and are substantially parallel to each other, the engagement blocks are respectively formed on the third surface and the fourth surface.

6. The optical fiber connector of claim 5, wherein the first surface defines a plurality of fixing holes corresponding to the through holes therein, an end of each optical fiber is fixed in a corresponding fixing hole, each lens is aligned with a corresponding optical fiber.

7. The optical fiber connector of claim 5, wherein the main portion comprises a positioning pole formed on the first surface thereof, the first side surface defines a position hole corresponding to the positioning pole, and the positioning pole is inserted into the position hole.

8. The optical fiber connector of claim 5, wherein the second surface comprises a cutout portion corresponding to the second resisting block, the cutout portion is resisted on the second resisting block.

9. The optical fiber connector of claim 7, wherein the optical fiber connector comprises an elastic member received in the position hole, two opposite ends of the elastic member respectively contact the connector hold and the positioning pole.

10. The optical fiber connector of claim 9, wherein the elastic member is a helix spring.

11. An optical fiber connector, comprising:
a connector hold including an insert and a sleeve surrounding the insert, the insert defining a receiving recess and a plurality of parallel through holes in communication with the receiving recess;
a plurality of optical fibers extending through the respective through holes and exposed at the receiving recess; and
a connector body held in the receiving recess, the connector body including a plurality of lens portions optically aligned with the respective optical fibers;
wherein the insert comprises two first resisting blocks and a second resisting block located between the first resisting blocks, the two first resisting blocks extend from two opposite side surfaces of the receiving recess toward each other, the connector body is resisted on the first resisting blocks and the second resisting block, the connector body comprises two elongated engagement blocks formed on opposite lateral surfaces thereof, the connector hold includes two grooves in the receiving recess, the grooves are parallel with the through holes, and the engagement blocks are engaged in the respective grooves.

* * * * *